United States Patent

Wiesener

[15] 3,661,276
[45] May 9, 1972

[54] EXTENDED REACH COUNTERWEIGHT
[72] Inventor: Robert W. Wiesener, Roseville, Minn.
[73] Assignee: Programmed & Remote Systems Corporation, St. Paul, Minn.
[22] Filed: Nov. 14, 1969
[21] Appl. No.: 876,899

[52] U.S. Cl. ........................................214/1 CM, 214/142
[51] Int. Cl. ............................................................B25j 3/00
[58] Field of Search .......................214/142, 1 CM; 248/364; 212/48, 49

[56] References Cited

UNITED STATES PATENTS

| | | | |
|---|---|---|---|
| 3,065,863 | 11/1962 | Saunders | 214/1 CM |
| 3,181,716 | 5/1965 | Brach | 214/142 |
| 3,297,172 | 1/1967 | Haaker et al. | 214/1 CM |

Primary Examiner—Gerald M. Forlenza
Assistant Examiner—Lawrence J. Oresky
Attorney—Dugger, Peterson, Johnson & Westman

[57] ABSTRACT

In an extended reach master-slave manipulator a counterweight mounted on the master side of the unit which automatically compensates for additional counterweighting needed when the slave arm is changed in length relative to the master arm. Mounting the counterweight on the master side of the unit reduces the total amount of counterweighting necessary, eliminates many parts which previously controlled the extended reach counterweight on the slave arm, and still accomplishes the feature of having the counterweight automatically adjust for differential extension of the slave arm as well as for an offset between the slave and master arm.

8 Claims, 5 Drawing Figures

INVENTOR.
ROBERT W. WIESENER

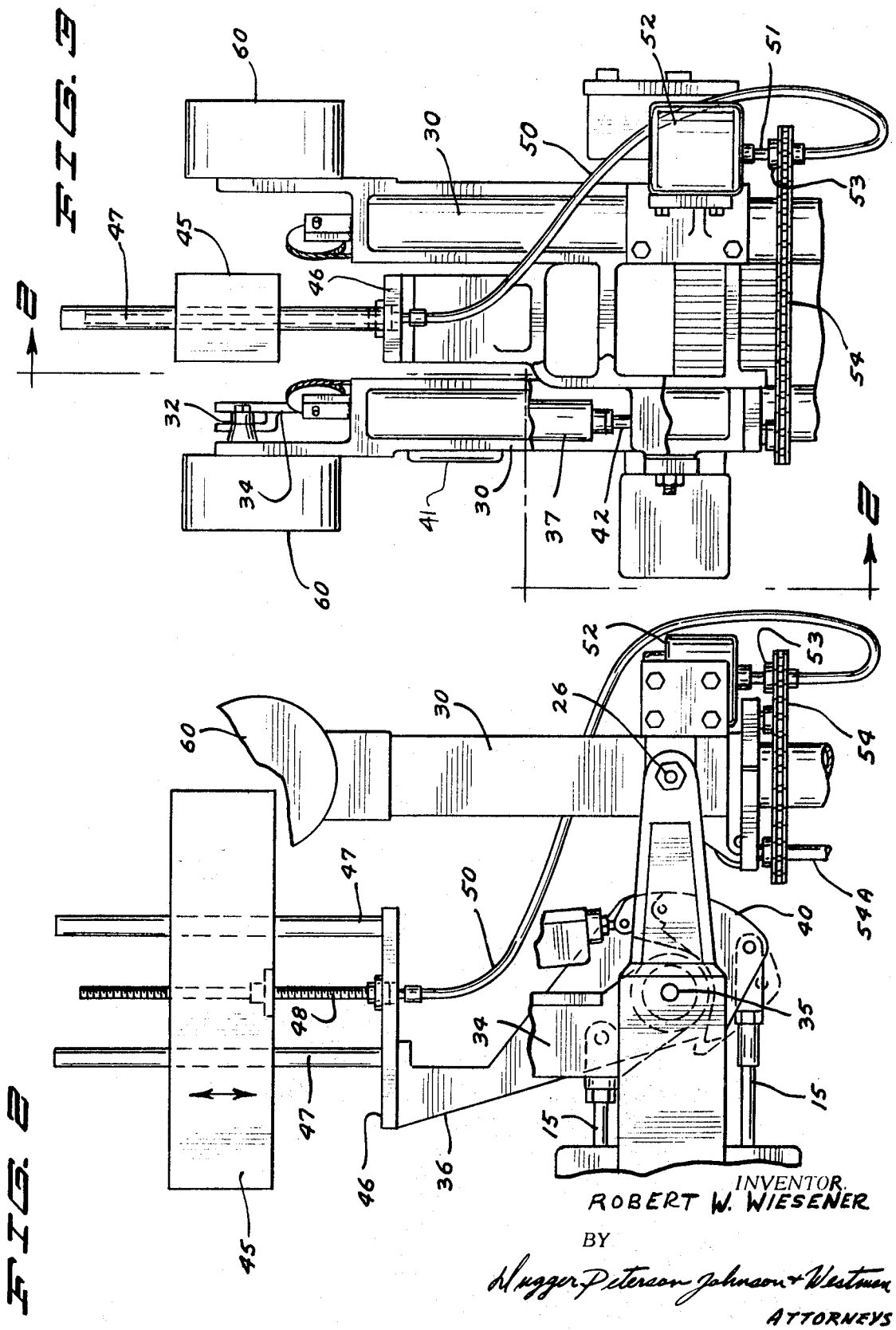

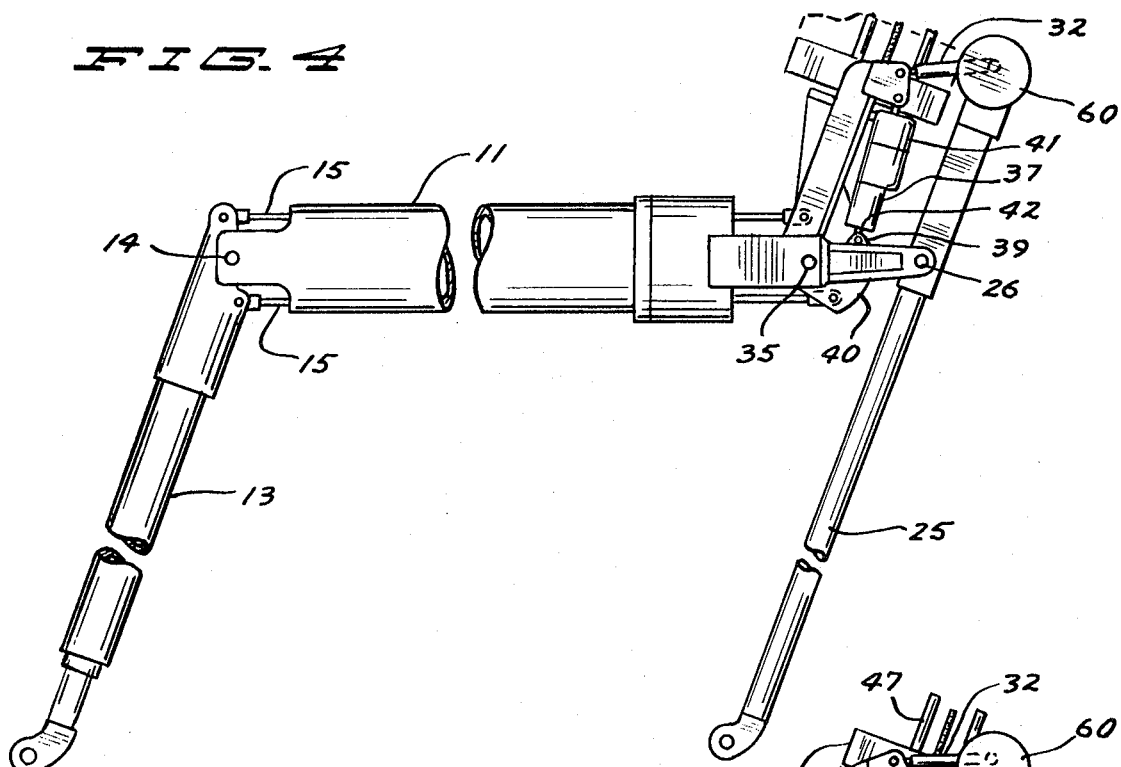
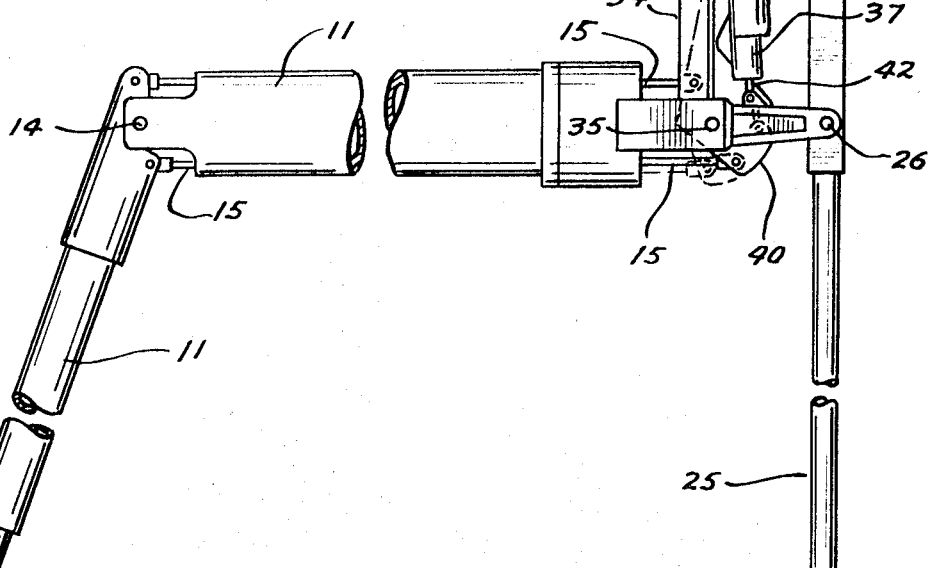

3,661,276

EXTENDED REACH COUNTERWEIGHT

BACKGROUND OF THE INVENTION

1. Field of the Invention

The present invention relates to counterweights for master-slave remote control manipulators.

2. Prior Art

In master-slave manipulators, mechanism permitting differentials in length between the master arm and the slave arm is shown in the U.S. Pat. to Saunders, No. 3,065,863. However, in this instance the counterweight which is necessary in order to balance the slave arm when extended is a movable weight right on the slave arm. When the slave arm is changed in length, the slave arm extended reach counterbalance weight will also move to a different position to provide an equalization of the moment of the above arm. The total overall weight of the slave arm is increased substantially. In Saunders the movable weight is twice the weight of the slave boom tube (main tube) plus the weight of the telescoping or extendable member. The counterweight necessary on the master side of the unit to counterbalance the slave arm assembly from the master side must then include enough weight to also counterbalance the movable counterweight for the extension feature.

This same type of an arrangement is shown in U.S. Pat. No. 3,297,172 where there is an extension possible of the slave arm, and here, also, the counterweight which is necessary for offsetting the weight of the slave arm when it is extended in a different manner is movably mounted right on the slave arm.

The construction and all of the controls of the master-slave manipulator are the same as those shown in U.S. Pat. No. 3,065,863 insofar as extending the slave arm is concerned, controlling the motions, and also controlling the grip.

SUMMARY OF THE INVENTION

The present invention has relation to a shiftable counterweight for a master-slave manipulator which has a differentially extendable slave arm to permit counterbalancing the extendable arm completely on the master side.

The unit is made so that the counter balance weight will automatically shift properly when the slave arm is extended by controlling movement of the weight with the controls for different lengths of the slave arm and it also automatically compensates for shifts in the position in the "Y" motion of the slave arm relative to the master.

The unit is simple to make, reduces the total amount of counterweighting necessary, and decreases the number of parts of the unit so that cost is decreased, as well as decreasing the number of movable parts that are in the contaminated atmosphere.

BRIEF DESCRIPTION OF THE DRAWINGS

FIG. 2 is an enlarged fragmentary side elevational view of the counterweight portion of the device of FIG. 1 taken as on line 2—2 in FIG. 3;

FIG. 3 is an end elevational view of the device of FIG. 2;

FIG. 4 is a schematic side elevational view showing the movement of the counterweight when the master and slave arms are moved; and FIG. 5 is a schematic side elevational view showing the positioning of the counterweight when the extended "Y" motion of the manipulator is in use.

DESCRIPTION OF THE PREFERRED EMBODIMENT

Figure 1:
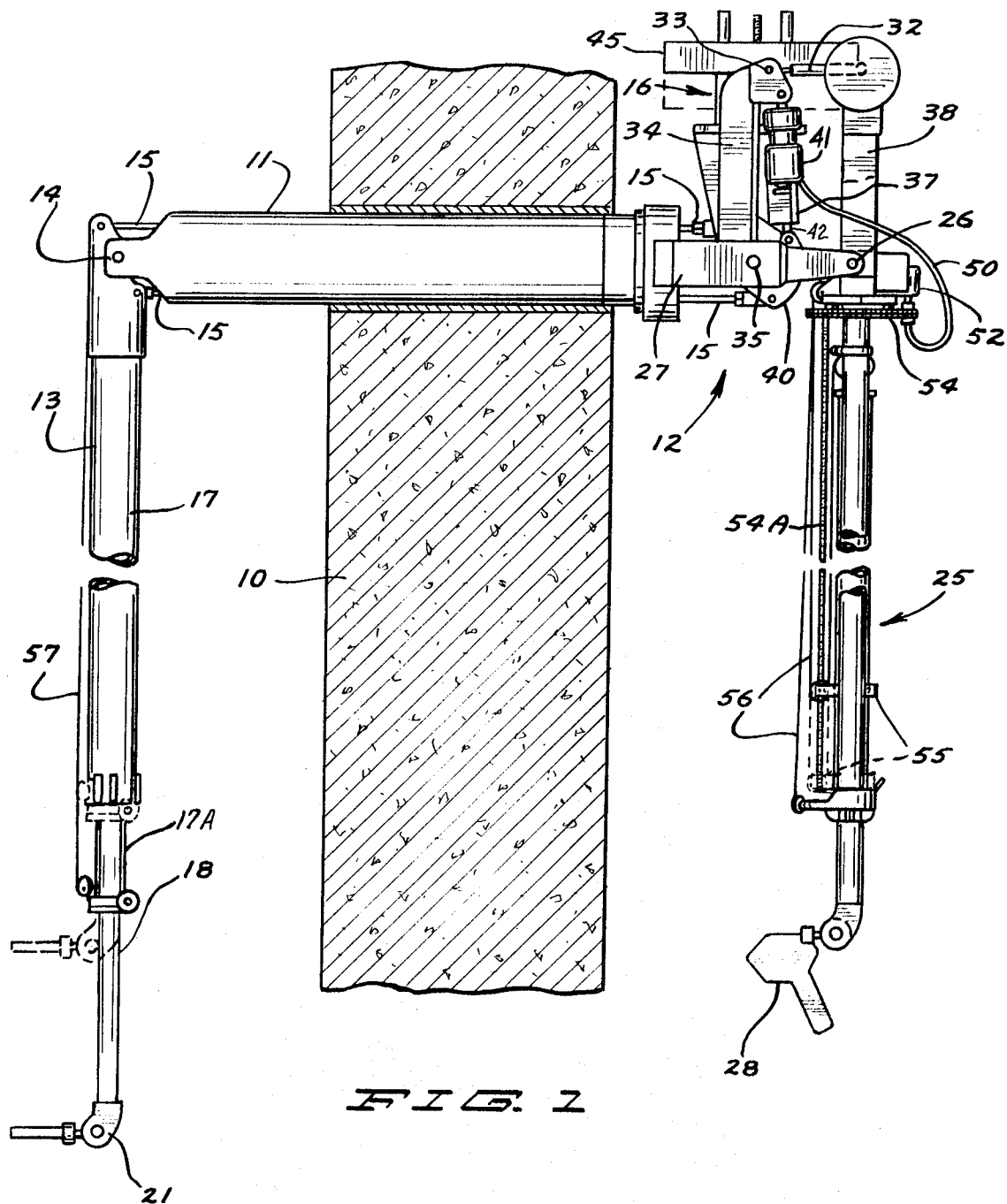
FIG. 1 is a side elevational view of a master-slave manipulator having a counterweighting mechanism made according to the present invention installed thereon.

In FIG. 1, there is a partition wall 10 that mounts a "through tube" assembly 11 of a master-slave manipulator illustrated generally at 12. The through tube assembly is mounted in a suitable manner so that it can rotate about its longitudinal axis in the conventional way for master-slave manipulators. On one end of the through tube 11 there is mounted a slave arm assembly 13. The slave arm assembly is pivotally mounted as at 14 for movement about this pivot in so-called "Y" direction (normal to the tube axis) and is controlled in movement through links illustrated at 15 extending through the through tube, and connected to an assembly illustrated generally at 16 on the master side of the unit.

The slave arm 13 is made up of an upper outer tube 17, an intermediate tube 17A and an inner tube 18. The detailed arrangement of the controls is as shown in U.S. Pat. No. 3,065,863, which disclosure is incorporated herein by reference. The grasper or gripper 21 on the slave arm is also mounted in a conventional manner to the slave arm and the unit is controlled from a master arm assembly 25. The master arm assembly is pivotally mounted as at 26, about a transverse pivot parallel to pivot 14, to a frame 27 that in turn is fixed to the through tube 11. The master arm has a controller handle 28 that is used for controlling the motions of a grasper 21 of the slave through suitable cables or tapes (not shown) and these controls are the usual ones used with master-slave manipulators shown in U.S. Pat. No. 2,764,301 to Goertz et al. and previous manipulators of this type.

When the handle 28 is moved up or down, the inner tube 18 of the slave unit will also be moved downwardly, or upwardly through the use of control tapes; when the master arm is swung about the longitudinal axis of the through tube, the slave arm will also swing; and when the master arm is pivoted around its axis 26, the slave arm will pivot by motion transferred through assembly 16 and connecting links 15. The assembly 16 is connected to an upwardly extending frame 30 on the master arm through a pivoted link 32. The link 32 is pivoted at one end to the frame 30 and at the other end as at 33 to a control lever 34 of the assembly 16. The control lever 34 is pivotally mounted about an axis 35 for the entire assembly. The entire assembly is positioned between the two frame members 27.

A large slave arm counterweight support 36 is also pivotally mounted on suitable pins and bearings about this same axis 35. The axis 35 is parallel to axis 14. The lever 34 and the counterweight support 36 are pivotally mounted about the same axis for movement relative to each other, except for a control link 37 that is mounted as at 38 to the upper end of the lever 34 and as at 39 to a bell crank portion 40 of the counterweight support 36. The link 37 is an extendable link having a motor portion 41 which can extend a rod 42 if desired through suitable controls. This will shift the slave arm about pivot 14 relative to the master arm. This type of operation is shown in Goertz Pat. No. 2,764,301. The control links 15 are attached through suitable clevises or rod end members to the counterweight support 36, and the position of the counterweight support about its pivot axis 35 determines the position of the slave arm about its axis 14. When the master arm is moved, the link 32 will cause the lever 34 to be moved about its pivot and at the same time the link 37 will transfer this motion to swing the counterweight support 36 (the lever 34, link 37 and counterweight support 36 act as a unit) and consequently the links 15 will move the slave arm about pivot 14 a corresponding amount. The counterweight support also moves with the master and slave arms about the longitudinal axis of the through tube.

A counterweight 45 is mounted on the counterweight support 36. The counterweight support 36 has a platform 46, a pair of spaced upstanding guide rods 47 fixed thereto and a center screw member 48 that is rotatably mounted through and supported by the plate 46. The counterweight 45 is provided with a threaded center opening and the screw 48 is threadably mounted through this threaded opening. Screw 48 is powered from a flexible shaft 50 that in turn is drivably mounted onto the outer end of an output shaft 51 of a motor 52. The motor 52 is mounted onto the framework for the master arm and drives a sprocket 53 that in turn drives a chain 54. The chain 54 drives sprockets that operate screws 54A for controlling the differential extension of the slave arm. The screws operate a pulley bank support unit or frame 55 at the lower end of the master arm, and when the unit 55 is raised, cables 56 mounted on suitable pulleys will be shifted in position and this in turn will cause cables 57 on the slave arm to shift and cause a lengthening of the slave arm. The master arm does not lengthen because the unit 55 slides along the master arm and this causes a differential extension of the slave arm with respect to the master arm so that the slave arm is now longer. This is shown in FIG. 1, with the normal position shown in dotted lines.

Now, when the slave arm is used it can be used to reach places that are further away then normal slave arms without changing the operating position of the master arm. The mechanism for accomplishing this differential is shown and explained in Saunders, U.S. Pat. No. 3,065,863. Screws 305 and unit 313 of Saunders patent are the same as screws 54A and unit 55 in this disclosure. However, as can be seen, when the slave arm is extended, and is moved for example in the "Y" motion as shown in FIG. 4, the weight of the slave arm creates a greater moment about the pivot point 14 so that the force necessary to counterbalance this moment is greater. In order to compensate for this, the counterweight 45 is raised from the plate 46 as shown in FIG. 1 and 2 when the slave arm is extended and the moment caused by the counterweight as it pivots about its axis 35 (or about the axis of the through tube) will be greater than that when it is down against the plate 46 as shown in dotted line in FIG. 1 and in FIG. 4. The proper selection of the lead of the screw 48 in relation to the movement of the slave arm gives an automatically compensated counterbalancing action. It is a matter of balancing the moments so that when the slave arm counterweight 45 is down against the plate 46 it will counterbalance the movement of the slave arm in its normal position or nonextended position. The slave counterweight 45 is moved outwardly along the pins or guides 47 at a sufficient rate when motor 52 is powered so that as the slave arm is extended the moment exerted by the slave arm when it is moved about the axis 14 will be balanced by the moment created by the slave counterweight about its axis 35. Control of course is through the link 32, and the lever 34, actuator 37 and the slave counterweight support 36. Thus whenever the master arm is moved about its pivot 26 the slave arm is moved and so is the slave counterweight. When the master arm is moved about the axis of the through tube, the counterweight is also moved about this axis as is the slave arm. The movable counterweight works in all directions of pivoting. The master arm is counterweighted with simple weights 60 at the top end of the master arm. It should also be noted that when the unit is moved about the longitudinal axis of the tube 11, the automatic counterweighting still takes place because the moment of the slave arm and the moment of the slave counterweighting will still be increased but equal because of the movement outwardly from the axis of the longitudinal tube of the slave counterweight.

When an offset or extended "Y" motion of the slave arm is to be used, then the linear actuator or link 37 is operated through its motor 41 and suitable controls to extend the rod 42, move the bell crank portion 40 about the pivot 35 relative to the lever 34 and of course at the same time move the counterweight support about this axis relative to the lever. Then, as shown in FIG. 5, the slave arm would be canted in this "Y" direction relative to the master arm and at the same time the slave counterweight would be canted. The positioning of the counterweight is proper even when the slave arm is canted as shown. If the slave arm is extended in length, the counterweight will again be moved to automatically compensate for the different moment of the slave arm so that the slave arm counterbalancing takes place automatically. This structure eliminates the need for a sliding counterweight of the sleeve type which has been present on the extendable slave arms previously, reduces the total amount of counterweighting necessary because it used to be necessary to also counterweight the slidable counterweight on the slave arm as well as the arm itself, and simplifies the mechanism by eliminating the need for the controls for the sliding counterweight while only adding guides on the plate support for the counterweight as well as a screw 48 for moving the counterweight and the drive therefore. The screw 48 has to have the proper lead to get the right proportion of movement of the counterweight in relation to movement of the slave arm.

The number of teeth on sprocket 53 also can be changed to properly adjust the proportion of movement of the counterweight in relation to movement of the slave arm.

What is claimed is:

1. In a remote control manipulator having a pivotally mounted master arm on a master side thereof and a pivotally mounted slave arm on a slave side thereof, means between said master arm and slave arm to correlate pivotal movement between said arms, means to cause a differential in length between said master arm and slave arm, and counterweight means for said slave arm pivotally mounted on the master side of the manipulator to counterbalance pivotal movement of said slave arm, and means coordinated with said means to cause a differential in length between said master arm and slave arm to change the effective position of said counterweight means for said slave arm with respect to the pivot axis of said counterweight means when said slave arm is changed in length with respect to the master arm to counterbalance the slave arm at its changed length.

2. The combination as specified in claim 1 wherein said counterweight means includes a support member pivotally mounted on said master side of said manipulator, and said support member including guide means, and power means to move said counterweight means along said guide means when said slave arm is changed in length with respect to the master arm.

3. The combination as specified in claim 2 wherein said power means includes a motor, actuating means coupled to said motor to cause differential in length between said master and slave arms, and a drivable connection between said motor and said means to move said counterweight with respect to its pivot.

4. The combination as specified in claim 3 wherein said means to move the counterweight comprises a screw member threadably mounted to drive said counterweight, said screw member being rotatably mounted with respect to the support member, and guide means for said counterweight to guide movement of said counterweight when said screw is rotated to move said counterweight with respect to said support member.

5. The combination as specified in claim 3 wherein said support member and said slave arm are connected for movement about parallel pivot axes in a first direction and about a common axis in a second normal direction, and link means between said master arm and said support member to permit movement of said counterweight and said slave arm about their respective pivot axes relative to said master arm.

6. In a remote control manipulator having a support tube, a master arm on a master side thereof and a slave arm on a slave side thereof, both pivotally mounted for movement about the tube axis and about second parallel axes normal to the tube axis and including means to obtain corresponding movement between said arms, first means operable to cause a differential in length between said master arm and slave arm, and counterweight means comprising a counterweight support pivotally mounted for movement with said arms about the tube axis and also about a pivot axis parallel to the second axis and including means coordinated with said first means to cause a differential in length between said master arm and slave arm to move the counterweight means with respect to the counterweight support and with respect to the counterweight pivot axis to change the counterweight moment arm when said first means are operated to thereby counterbalance the slave arm at the differential slave arm length.

7. The combination as specified in claim 6 wherein said first means includes power means, and wherein said power means move said counterweight means further out from its pivot axis when said slave arm is differentially extended with respect to the master arm.

8. In a remote control manipulator having a pivotally mounted master arm on a master side thereof and a pivotally mounted slave arm on a slave side thereof, means between said master arm and slave arm to correlate pivotal movement between said arms, means to cause a differential in length between said master arm and slave arm comprising power means, and counterweight means pivotally mounted on the master side of the manipulator to counterbalance pivotal movement of said slave arm, and means coordinated with said power means to cause a differential in length between said master arm and slave arm to move said counterweight means farther out from its pivot axis when said slave arm is made longer than the master arm.

* * * * *